US005579165A

United States Patent [19]
Michel et al.

[11] Patent Number: 5,579,165
[45] Date of Patent: *Nov. 26, 1996

[54] COMPUTERIZED BINOCULARS

[75] Inventors: Claude Michel, Asnieres; Philippe Giry, Bois-Colombes, both of France

[73] Assignee: Thomson-CSF, Puteaux, France

[*] Notice: The term of this patent shall not extend beyond the expiration date of Pat. No. 5,416,633.

[21] Appl. No.: 968,177

[22] Filed: Oct. 29, 1992

[30] Foreign Application Priority Data

Oct. 31, 1991 [FR] France ................................. 91 13490

[51] Int. Cl.⁶ ........................... G02B 27/14; G02B 23/00
[52] U.S. Cl. ........................ 359/630; 359/407; 359/410
[58] Field of Search ..................................... 359/407–410, 359/470, 482, 629–631, 430; 250/491.1, 203.1–203.2, 203.6–203.7

[56] References Cited

U.S. PATENT DOCUMENTS

| | | | |
|---|---|---|---|
| 4,012,123 | 3/1977 | Fuller | 359/630 |
| 4,205,894 | 6/1980 | Monroe | 359/412 |
| 4,272,783 | 6/1981 | Warnstam et al. | 250/203.1 |
| 4,306,630 | 12/1981 | Monte et al. | 359/407 |
| 4,539,701 | 9/1985 | Galbreath et al. | 359/470 |
| 4,688,037 | 8/1987 | Krieg | 250/491.1 |
| 4,731,243 | 3/1988 | Michel et al. | 364/200 |
| 4,764,881 | 8/1988 | Gagnon | 359/430 |
| 4,806,005 | 2/1989 | Schneider et al. | 359/407 |
| 4,915,487 | 4/1990 | Riddell, III et al. | 359/630 |
| 4,968,123 | 11/1990 | Fourwier, Jr. et al. | 359/630 |
| 5,416,633 | 5/1995 | Michel et al. | 359/410 |

FOREIGN PATENT DOCUMENTS

| | | |
|---|---|---|
| 2593932 | 8/1987 | European Pat. Off. . |
| A0315742 | 8/1988 | European Pat. Off. . |
| 1403575 | 8/1975 | United Kingdom . |
| 2143948 | 2/1985 | United Kingdom . |

OTHER PUBLICATIONS

English Abstract of European Patent Reference No. 2,593,932.

Primary Examiner—Thong Nguyen
Attorney, Agent, or Firm—Roland Plottel

[57] ABSTRACT

The invention is an optical device, similar to a pair of binoculars, which includes, between the objective lens and the eyepiece a miniature screen displaying an image controlled by a computer, and an optical reflex device capable of superimposing the screen image on the image seen through the objective lens. The device also includes, selectively or cumulatively, a variable light attenuator, a light amplifier for night vision, sensors to detect the line of sight of the optical device, and a computer which can also be selectively or cumulatively connected to a localization receiver of the "global positioning system" type and a transceiver. The device can be used to add further information on geographic positions, friends, enemies, infrared images, etc. into the scene seen through the binoculars.

20 Claims, 9 Drawing Sheets

COMPUTERIZED BINOCULARS

BACKGROUND OF THE INVENTION

The invention is a viewing device, particularly a viewing device which allows an image consisting, for example, of symbols such as geographic or any other symbols, to be superimposed on a first image of, for example, a natural scene.

In the prior art, scenes are observed through a telescope (the navy) or, more frequently, through binoculars, appreciated for the luminosity of the image produced. The observer then notes what he sees either manually on a paper map or, via a keyboard, on a computerized map.

SUMMARY OF THE INVENTION

According to this invention, there is provided a new type of interface which allows data concerning the scene observed to be recorded directly on a computerized map. It also facilitates appreciation of the data by displaying a second image superimposed on the natural image. This second image can be a symbolic image extracted from a map of the scene observed and indicating, for example, waterways, railways, bridges, contours and other outstanding features in the scene. In addition to these geographical symbols, the invention also allows other symbols representing, for example, friendly or enemy positions to be indicated using symbols indicative of the type of position (tank, machine gun nest, etc.).

This second image can also be a synthetic image processed to be displayed in addition to what is observed. For example if the scene includes an archaeological site, it is possible to display a reconstitution of the site. Similarly, it would be possible to superimpose an image of a finished building on the scene while the building is under construction.

Finally, to fulfil, for example, military functions, the device invented allows individuals carrying the device to communicate with each other and enter the data viewed by other members of the military formation directly on computerized maps.

The above applications of the invented device are those employed when the invention is used as viewing device called, by analogy with aeronautical applications, a "head-up display", i.e. a viewing device in which an image, intended to represent points, lines or surfaces, is superimposed on an image of the geographical zone.

The invented device can also be used as a head-down display. In this application, the outside scene is no longer required and the device is used solely to display an image generated by a computer and the associated memory. The image can be an image of the geographical area around the observer or nearby zones at various scales. It is also possible, easily and using natural movements, to scroll the map in various directions chosen by the user.

Finally, the invention satisfies all these applications in a light-weight, inexpensive form.

This invention is a viewing device with a casing which houses optical components, including an objective lens and an eyepiece, these components providing a view along an axis known as the "optical axis", components to adjust the focus, accessible from outside the housing, these optical components creating an image from a field of view which may include all or part of a zone defined by the optical axis and aperture angle of the optical components, the device also including:

components to display a luminous image generated by controllable pixels, at least one optical reflex component to superimpose the image from the display components on the image of the field of view.

The invention is, therefore, a field glass, either a telescope or binoculars, comprising a casing which contains the objective lens and the eyepiece and, preferably between these two, an image generating device and a reflex device of the semi-transparent slide type which allows another image, that of a screen, to be superimposed on the image seen through the objective lens and at the same position. The image generated by the screen may itself be luminous, for example if the screen is a light-emitting screen formed from a light-emitting powder known to the prior art, this powder being placed between two glass slides which contain a network of electrodes. The arrangement of these electrodes defines the number of pixels in the image which can be formed. The luminous intensity of each pixel depends on the field created between the electrodes which control that pixel. Depending on the screen configuration, the image can be monochromatic or polychromatic.

The composition of such screens, and the means of controlling them, are known to the prior art and will not be described further.

The image generated by the screen need not necessarily be luminous in itself and, in this case, a lighting device must be added. This device can be of any type known to the prior art, particularly a light-emitting plate, a diode, a fluorescent tube, etc.

The reflex device projects the image from the screen into the optical path in the binoculars. It comprises a semi-transparent slide which, preferably, can be retracted by rotation to allow the user to select either the outside image alone or the image from the screen superimposed on the outside image.

The reflex system can also include, between the screen and the semi-transparent slide, other optical components such as lenses or mirrors to adjust the size of the screen image and the optical path this image follows. All these devices can also be replaced by a hologram acting as a mirror and a lens.

The invented device can include, in addition to the screen and the reflex system, additional components to act as an objective lens shutter.

The word "additional" is included because, in the prior art, telescopes generally include pivoting or sliding shutters to protect the objective lens but which can also be used as a shutter.

With a shutter, the invented device can be used as a head-down display to view the image of the screen only.

In this configuration, the optical device is similar to a magnifying glass that can be used to display the screen image at a reasonable scale. This type of shutter, which is convenient for head-down work, may be too crude for head-up use.

In this second mode, it may be required to display the outside image and the screen image alternately. In this case, the shutter can be a liquid crystal slide with two faces, each face carrying a transparent electrode.

Depending on the voltage applied, the crystals absorb a varying amount of outside light. This type of shutter has a double advantage: firstly, it allows head-down work as described above and, secondly, it can be used to adjust the brightness of the outside image so that there is no excessive difference in brightness between the outside image and the screen image and the two images are clearly visible simultaneously.

An important aspect of the invention, and one which makes it particularly easy to use, is that the optical system is fitted with sensors to define the direction of its line of sight, this direction being defined by its elevation and azimuth.

The sensors can be any type of device capable of measuring an angle relative to a known reference. As a nonexhaustive example, they can be:

a compass and an inclinometer to indicate the azimuth and elevation. Inclinometers are known to the prior art and include a deformable capacitance whose value, when static, varies as a function of its inclination to the vertical. The sensors can also be three optical-fiber gyrometer. One of these gyrometers could be a fiber wound around the optical device casing, the centerline of this winding being parallel to the line of sight, and two windings, mutually perpendicular and perpendicular to the optical axis. When the telescope is static, the only rotational motion applied to these gyros is the rotation of the earth, i.e. 15°/hour. The rates of rotation measured on the various axes can therefore be used to determine the position of the optical device relative to the axis of rotation of the earth and, consequently, provided the latitude of the site is known, the elevation and azimuth of the optical device.

The type of sensor chosen will result from a compromise between overall dimensions, weight, measurement accuracy and the cost of sensors.

The optical device invented can also be fitted with, for example, a laser range-finder. This range-finder is then capable of indicating the distance to an object on the telescope line of sight.

It was said earlier that the binoculars complying with the invention included a screen producing pixels, the status of the various pixels depending on the voltage applied across the terminals of the electrodes which control each pixel.

Preferably, this electrode voltage is controlled by a computer. Methods of achieving such control, using sets of instructions, data stored in a memory and the means to read the data from data storage devices, such as magnetic devices or optical disks are known to the prior art and will not be described further.

In the application described here, the data stored mainly comprises geographical maps, with the possibility of adding or deleting symbols from these maps to provide a real-time representation of additional data concerning aspects of the geographical sites represented by the maps. The data stored can also include silhouettes, for example of friendly or enemy tanks; in this case, it is preferable to include software capable of varying the scale and angle of view. Such software is known to industry and is used, particularly, in computer-aided design (CAD). The silhouettes and software can then be used in the head-up or head-down configuration to assist the person using the device to identify items in his field of view.

The computer software is preferably controlled by buttons on the optical device casing and by the movement of the telescope itself, these movements being indicated by directional sensors. The buttons are arranged so that they can be operated when the binoculars are held in the observation position, even if the user is wearing gloves.

It was said earlier that, in certain cases, to determine the line of sight of the telescope, it is necessary to know at least one item of data on the current geographical site—the latitude, value and direction of the magnetic field. The position of the site can be determined by adding a localizer system to the display device. This system can consist of ground-level or satellite beacon receivers, for example "global positioning system" (G.P.S.) beacons or equivalent (GLONAS NAVSTAR LORAN C) (Reserved designations). The localizing device can also be a self-contained positioning system, such as a localizing pedometer. This system is described in French published patent application No. 90.15160 deposited on the 4th Dec. 1990.

The device is a navigation system for pedestrians. It is placed in the heel of the walker's shoe. It comprises accelerometers, a direction reference system and a computer. The computer calculates the new geographical position from the old position by integrating the accelerometer signals. To remain compact and inexpensive, the sensors (acceleration and direction) are crude. The invention uses halts in the foot movements, detected when the acceleration and speed values are less than certain thresholds, to reset the accelerometers and the integrators. After resetting, the accelerometer outputs are used to determine the position and to correct the direction references. Finally, the position of the site can also be determined using the components already described and triangulation by dedicated software. In this case, it is only necessary to align the telescope, in succession, on a few outstanding features in the area shown on a map of the zone observed.

Finally, because the device is also intended to be used by each member of a team cooperating on a task, the computer in the device also preferably operates transmission circuits to transmit additional information collected by each member of the team to the other members or to a central command unit and circuits to receive information from the central command unit or from other team members.

To summarize, the invention described above is a pair of binoculars whose casing houses a screen, an image of which can be displayed alone or superimposed on the image of the outside scene. These binoculars also include the means of determining the direction of the line of sight. The image on the screen is controlled by a computer, the user-computer interface consisting of buttons on the binoculars or detection of the binoculars' movements.

The computer can be connected to a transceiver and to a localization system. The way in which these various components are connected together can vary and basically depends on the weight and overall dimensions of the various components.

BRIEF DESCRIPTION OF THE DRAWINGS

A specific example of an embodiment and its variants will now be described, referring to the appended drawings in which.

DESCRIPTION OF THE PREFERRED EMBODIMENTS

The particular embodiment of the device which will be described here is a pair of binoculars with two telescopes, each containing an objective lens and an eyepiece. As far as the optical section is concerned, the following description applies to only one of the telescopes, i.e. that which contains the additional devices complying with the invention.

Figure 1:
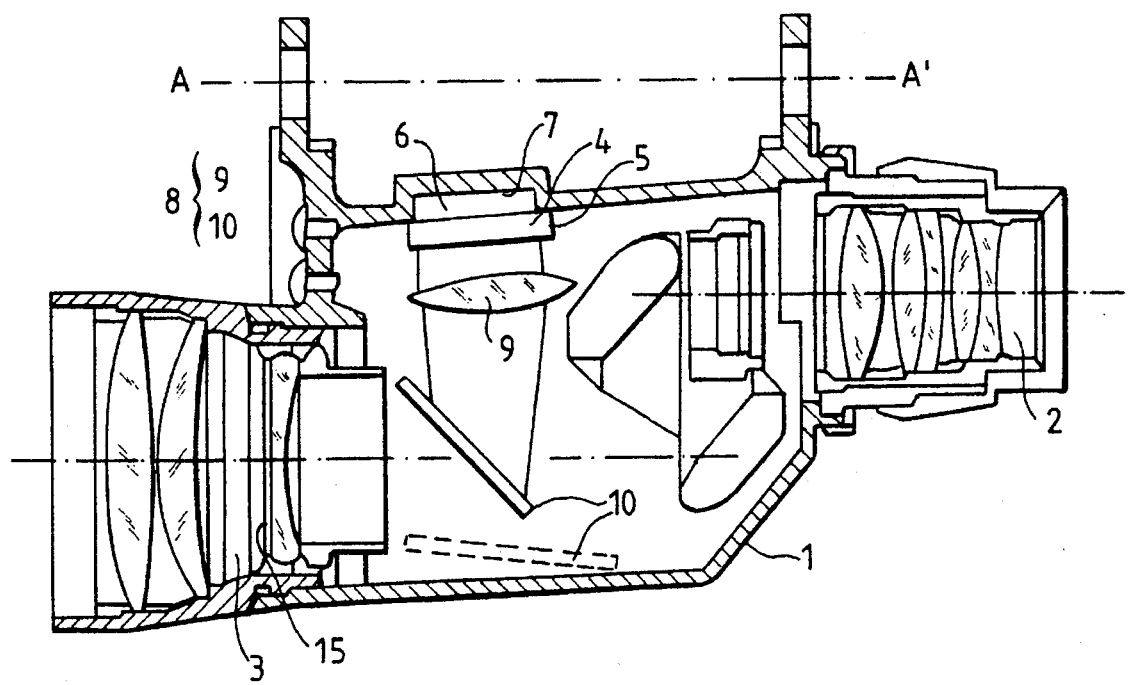
FIG. 1 is a longitudinal cross-section on the horizontal plane through the center of one telescope in a pair of binoculars complying with the invention.

FIG. 1 is a longitudinal cross-section on a horizontal plane through the center of a binocular telescope complying with the invention containing the devices to generate the second image.

Conventionally, the telescope includes a casing 1, eyepiece 2 and objective lens 3. The binocular line of sight is represented by the line AA' which is the axis of symmetry of the two telescopes.

In the particular device shown, the telescope also includes, positioned laterally between the eyepiece and the objective lens, a device to display an electronic image, consisting of screen 4, made of small liquid crystals. The total area of the screen is 24×24 mm². This area can contain 512×512 pixels, each measuring 30×30 cm². The screen borders are 3 mm wide and are used for connection to an electrode network. The network and a lighting device are connected to a connector 5 for connection to an outside computer, possibly via an adaptor interface board. The electric power supply is 3 mA at 5 volts. The lighting device consists of a light-emitting plate 6, of the same dimensions as the screen, which offers the advantage of being very thin—approx 1 mm thick—and offering spectrum selectivity adaptable to a reflex dichroic mirror 7. The combined power consumption of the screen and its lighting system, under the conditions in which they are used in the invention and to provide the required contrast with the outside luminosity, is 0.01 to 2 watts.

An optical device 8, consisting in this case of a lens 9 and a slide 10 with parallel semi-transparent faces, positioned at 45° to the optical axis of the objective lens, allows the image from the screen to be superimposed on the image seen through the objective lens. The composition of the image reflex device and the screen arrangement can be different in other variants.

Figure 2A:
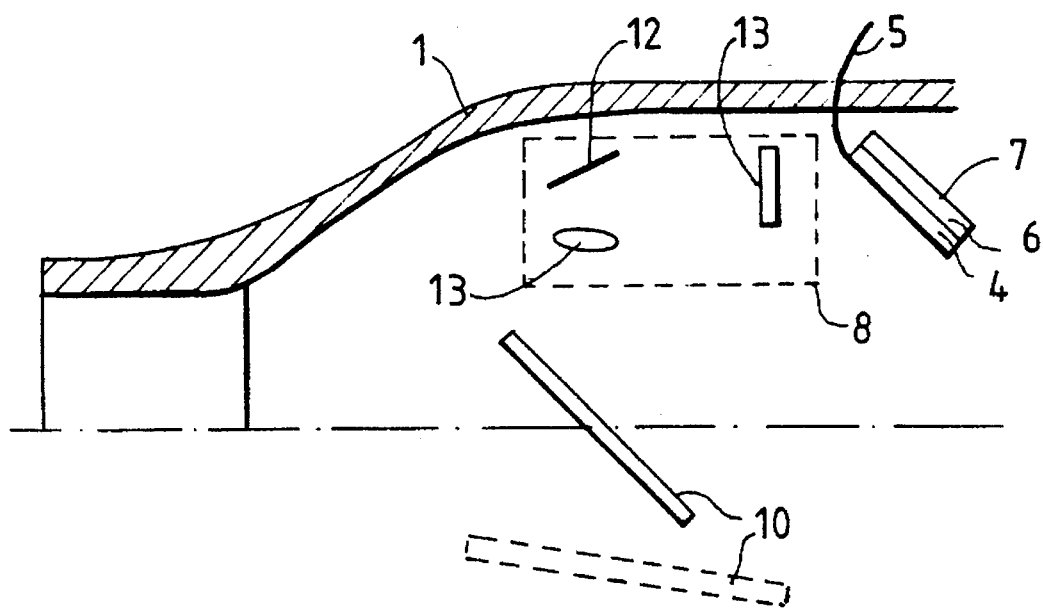
FIGS. 2a and 2b are schematic views of two alternative embodiments.
Figure 2B:
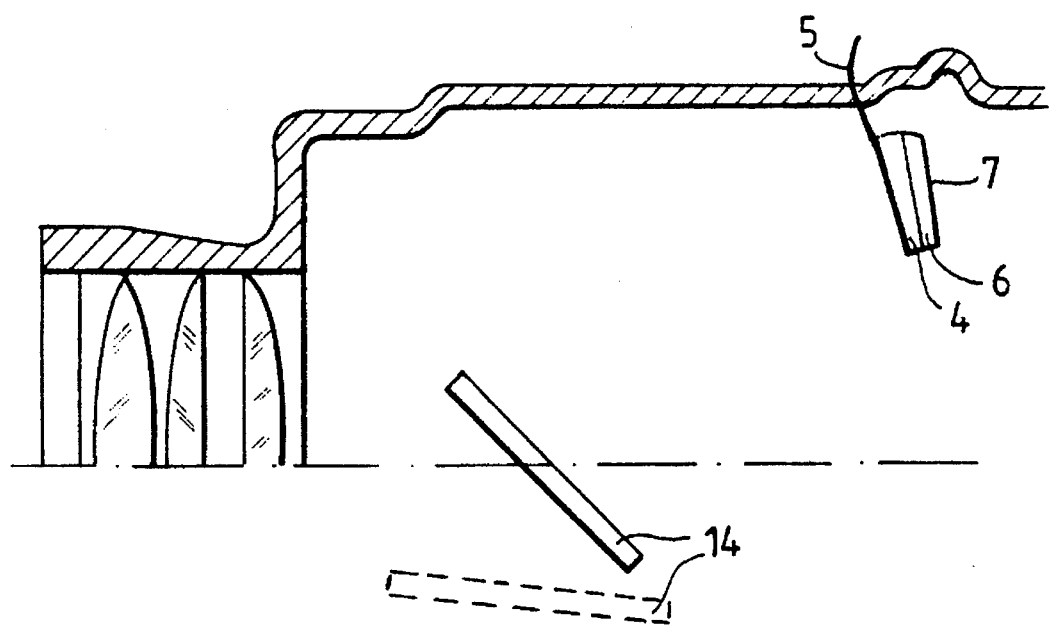

FIG. 2 is a schematic view of variants in one of which (FIG. 2a), to obtain a longer optical path between the screen 4 and the reflex slide 10, the screen 4 is positioned differently.

In this case, the optical reflex device 8 consists of a reflex mirror 12 and one or several lenses 13.

In the other variant (FIG. 2b), the reflex device 8 and the semi-transparent slide 10 are replaced by a hologram 14 which acts both as a lens and a mirror. The hologram 14 is in the position of the slide 10.

In all variants, the slide 10 or hologram 14 can be retracted, for example by rotation. The retracted position is shown by dotted lines.

Figure 3:
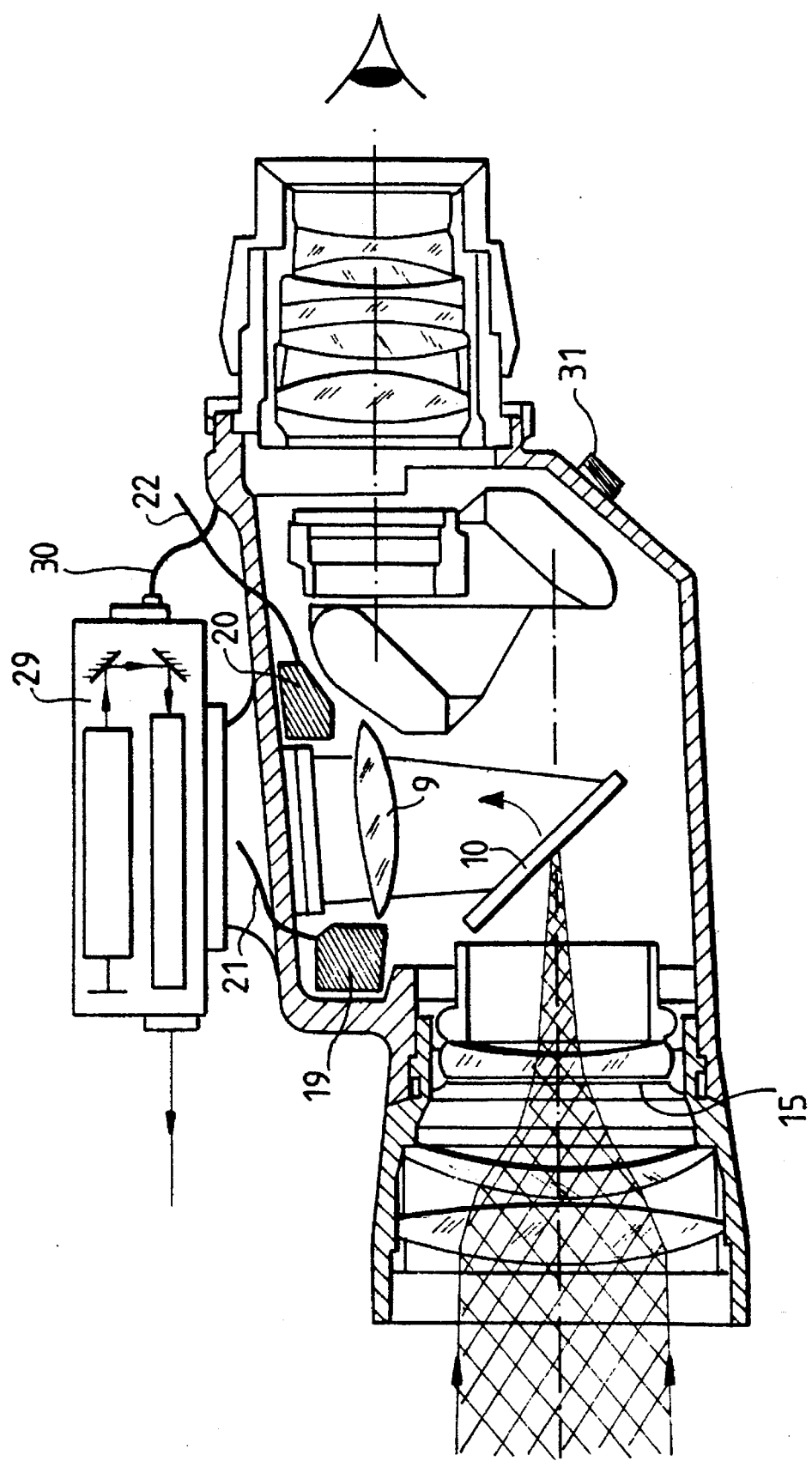
FIG. 3 represents the telescope shown in FIG. 1.

FIG. 3 shows the same section on the same binocular telescope as FIG. 1 but includes additional components described below.

The additional components include a variable optical transmission attenuator 15. This attenuator 15, already known to the prior art, is a set of two transparent slides between which is inserted a liquid crystal with chiral dichroic molecules. Depending on the orientation of the molecules, controlled by transparent electrodes on the slides, the slide allows more or less light to pass. The transmissivity can be varied from almost total to almost zero.

The device complying with the invention also includes devices to measure the direction of the telescope line of sight; these devices include a magnetometer 19 mounted transversely in the casing 1, behind the objective lens.

Figure 4:
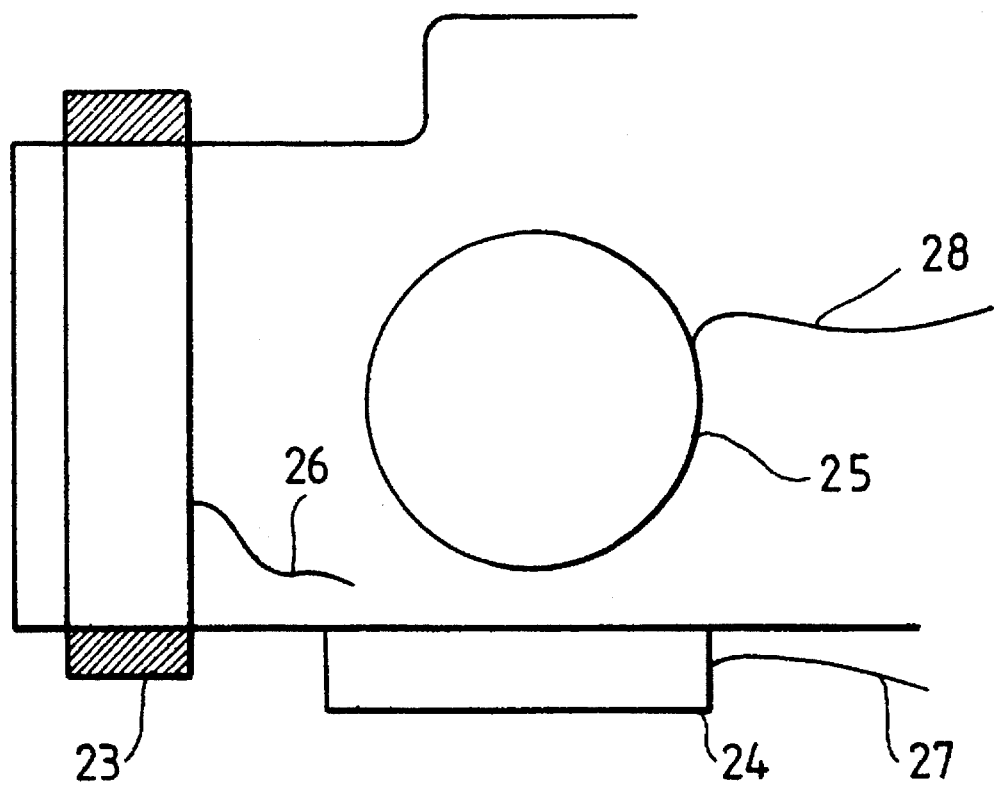
FIG. 4 is a partial side view, on the objective lens end of the casing for a variant.

The magnetometor 19 indicates the azimuth. An inclinometer 20, also mounted in the casing, indicates the elevation. The data from these instruments can be transmitted, in digital form, to a computer via links 21 and 22. It should be noted that there can also be variants on these position indicator devices; one such variant, using optical fiber gyrometers, is shown on FIG. 4. FIG. 4 shows a side view on the objective lens end of a binocular casing for a variant. This casing carries, on its outside, three optical fiber windings 23, 24 and 25 which act as rate gyro sensors. The centerlines of these windings are respectively the objective lens optical axis and two axes perpendicular to the objective lens optical axis. The data output by these rate gyros can be transmitted, in digital form, to a computer via links 26, 27 and 28.

The most sophisticated form of binoculars complying with the invention also includes a laser range-finder 29. This range-finder is mounted between the two telescopes in the binoculars such that its line of sight corresponds with the line of sight of the binoculars AA'; the range-finder data can be transmitted to a computer via a link 30.

In a less sophisticated version, the position of the focus adjustment button 51 (FIG. 5) is detected (by any known means) and transmitted to the computer which then determines a position range.

All the links to the computer which, in this embodiment, are outside the binoculars are connected to the binoculars by the connector 31. Consequently, in the most sophisticated version, this connector carries links 5, 21, 22 and 30 or the links from other direction-sensors 26–28 and from connector 52 originating from the buttons 40 and 41 which will be described later.

FIG. 5 shows a pair of binoculars complete with a computer which can be connected to them.

This figure shows the complete binoculars assembly item 32 described above. The binoculars are connected, via a connection box 31 and link 33, to a computer 34.

The computer includes an optical disk drive 35. It is itself linked, via connection 36, to a localization receiver device 37 and, via a link 38, to a transceiver unit 39.

Figure 5A:
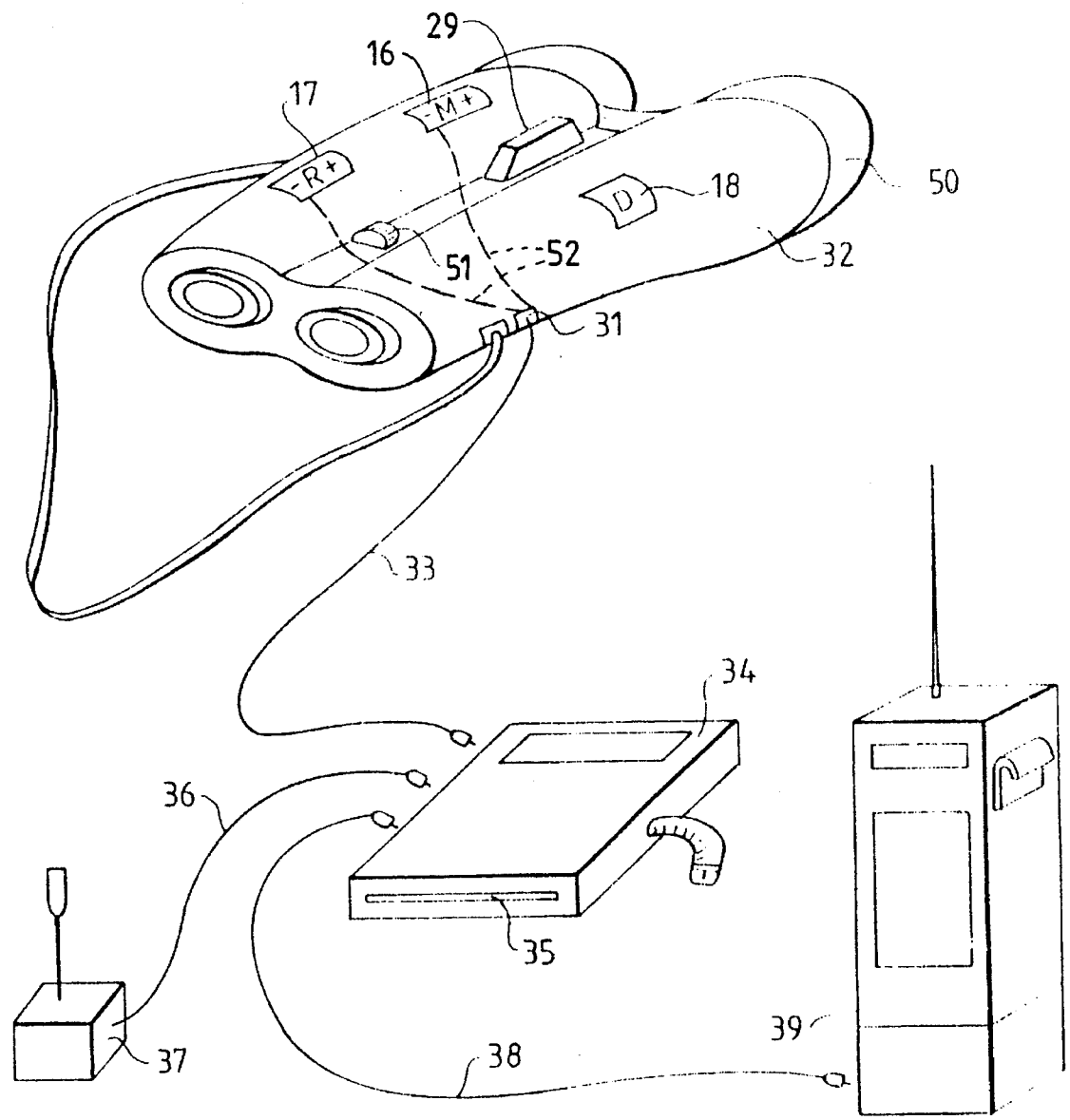
FIGS. 5a and 5b are schematic views of two embodiments of the binocular assembly and the connectable computer.

One of the aims in the preferred embodiment shown in FIG. 5a is to reduce the number of buttons so that they can be relatively large and separated from each other to allow a user to operate them even when wearing gloves. In this version, the computer is controlled by the buttons and by the binocular movements made by the user.

FIG. 5 shows, on the left-hand telescope, two buttons 16 and 17, marked M and R, to respectively select the mode and adjust the binoculars. The right-hand telescope includes a button 18, marked D for designation. These buttons and the binocular movements are used to input data or commands to computer 34. Buttons 16 and 17, marked M and R, have three positions, +, − and neutral. An audible "bip", not shown, complying with the prior art, confirms when a button is pressed. The button blocks can be connected to the computer via link 52. The operation depends heavily on the software. A brief description of software will be given below as an introduction to the description of FIG. 6 which shows the device computer architecture. The software description is "brief" since it is limited to a few aspects of software needed to understand the data input and/or control using buttons 16, 17 and 18 and the binocular movements sensed by directional sensors 19 and 20.

The software is controlled by scrolling menus. When the system is switched on, by a device not shown, a "menu" image is displayed. A cursor displayed in the image is moved by sensors 19 and 20 when they sense the movement of the binoculars. In this function, the cursor is considered as static. The image follows the binocular movements, for example decreasing the elevation of the binoculars makes the cursor rise or rotating the binoculars to the right moves the cursor to the left of the image.

The movements can therefore be used to choose an item in the menu by setting the cursor to it and then selecting the item by pressing the "D" button 18.

One of the menu items offers the possibility of choosing alphanumeric characters which, when characters are selected in succession, form a message displayed in a dialog window. This therefore forms the equivalent of a keyboard.

The scrolling of a menu can be stopped when the computer receives a message from an outside component, for example from a transceiver unit 39 (FIG. 5). This message can trigger an audible "bip" and/or display a window in the dialog image. The user can press button D to accept this message which is then given priority for processing, the system displaying a menu to match the type of message.

The various items in the menu include a "head-up" sub-menu which makes it possible, for example, to display the data in the computer memory. In this case, the data must be correlated to the telescope field of view. The field of view is calculated from information on the observer's position, output by the localization receiver, and the telescope angle of sight output by directional sensors 19 and 20. The software then allows the data display to be selected (position of elements represented by suitable symbols). Changing the orientation of the telescope triggers a change in the memory addresses read to process the data so that the data displayed is always correlated to the position of the image observed.

The various items in the menu also include a head-down sub-menu.

This menu basically allows selection of different types of map display.

Figure 7:
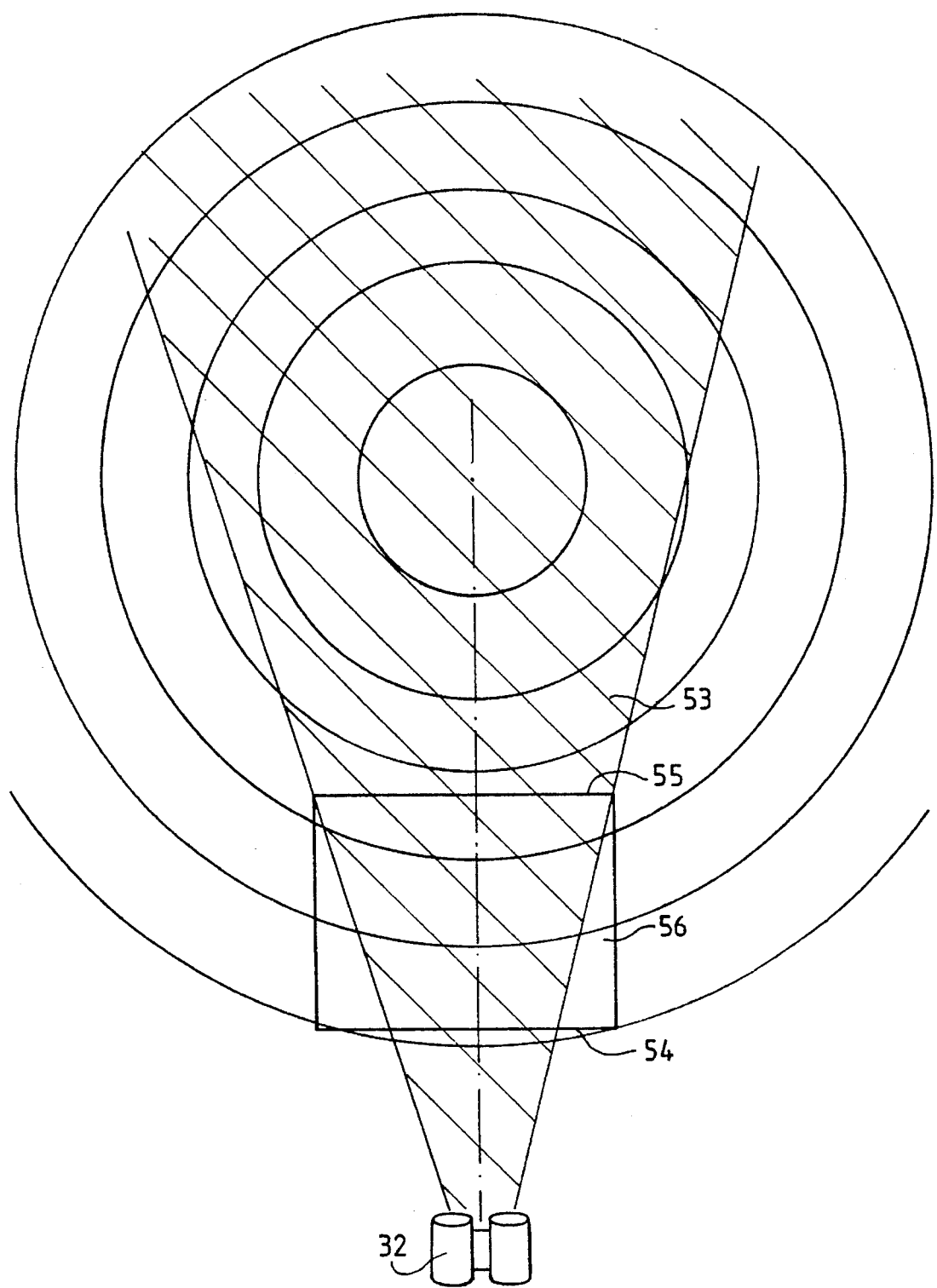
FIG. 7 represents an example of how natural binocular movements can be used to change the second image.

In the mode known as the "map table", a geographical map is displayed such that a line from the center top to the center bottom of the map corresponds to the binocular line of sight, the top and bottom points being at required positions which can be adjusted (increased or decreased) using button R and selected by button D. The display scale is calculated such that the map occupies the whole screen. The map is scanned from side to side by changing the direction of the binoculars. The positions of elements, represented by symbols, can also be displayed when selected. FIG. 7 represents the various areas of the map which can be displayed. This figure represents the binoculars 32 and a sector 53 corresponding to the zone displayed by the binoculars. Buttons R and D can be used to select a near limit 54 and a far limit 55. The zone displayed is then a rectangle 56 whose width is determined by the binocular aperture and the crosswise distance seen at the selected far limit 55. In FIG. 7, the sector 53 is shown shaded, and the circles represent points which are at equal distance of a point which is the intersection between the axis of the binoculars (32) and the observed area.

In an "Atlas" mode, the map is displayed in pages as in an atlas. The first page displayed in the mode is that containing the carrier. The display scale is indicated and can be changed using button R. Scan arrows located on the four sides of the map allow selection of the upper, lower, right-hand or left-hand page. The position of the moving carrier changes relative to the map, which remains stationary.

In a mode known as the "Navigation mode", the carrier's position is systematically in the center of the map displayed. The orientation of the binoculars is indicated by an arrow. The map moves as the carrier moves. In all cases, there is a dialog window at the bottom of the screen to receive messages. These are acknowledged, read or memorized by designation.

Figure 6:
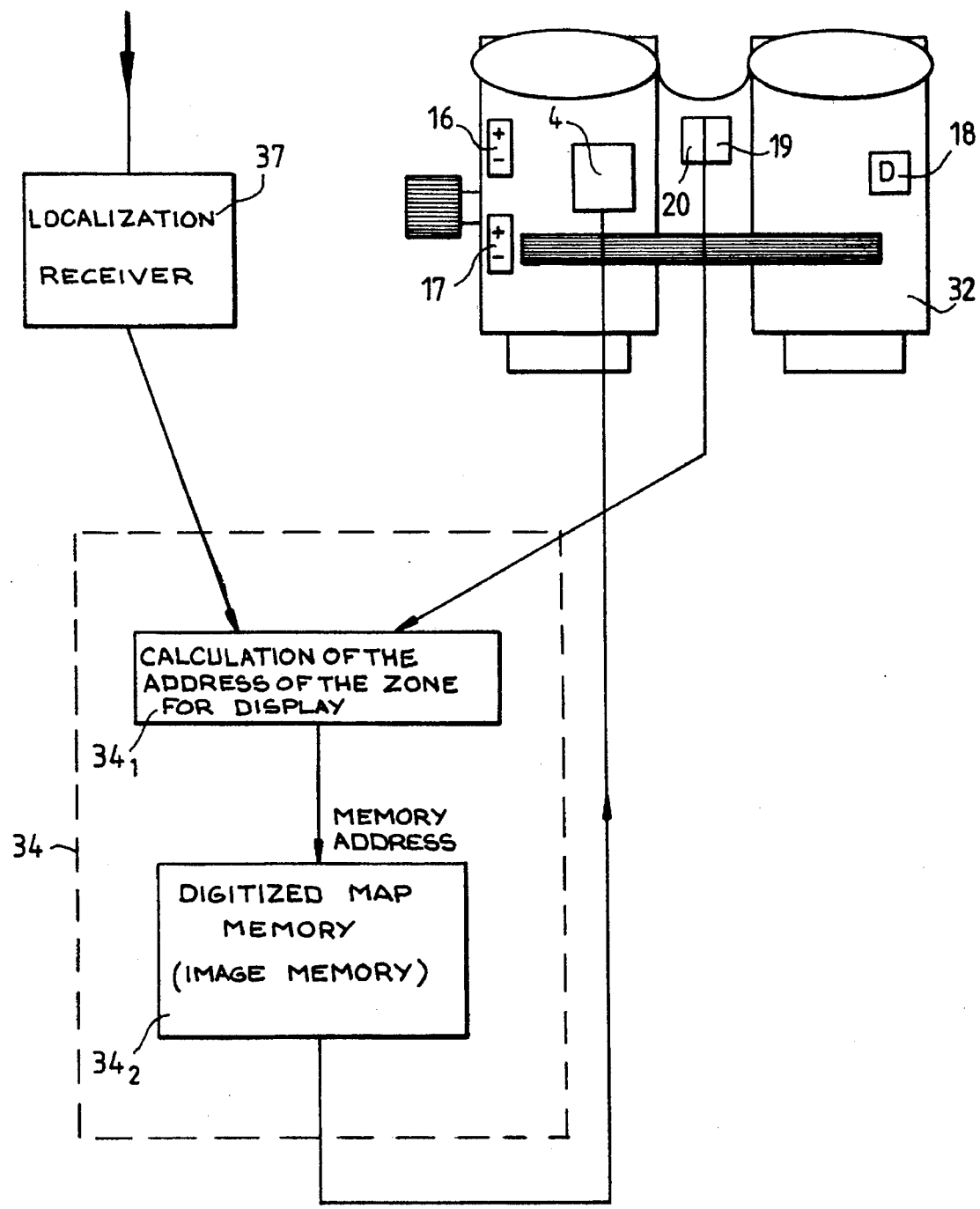
FIG. 6 represents the data processing architecture of the binocular assembly complying with the invention.

FIG. 6 illustrates the computer structure required to use such software in the way described above. Computer 34 includes an address calculation processor 34-1 which receives data from the localization receiver 37 and sensors 19 and 20 and sets of instructions, selected by the commands transmitted through buttons 16 and 18. Data selected on an external memory 34-2, for example an optical disk, is then input to the computer to control screen 4.

Figure 5B:
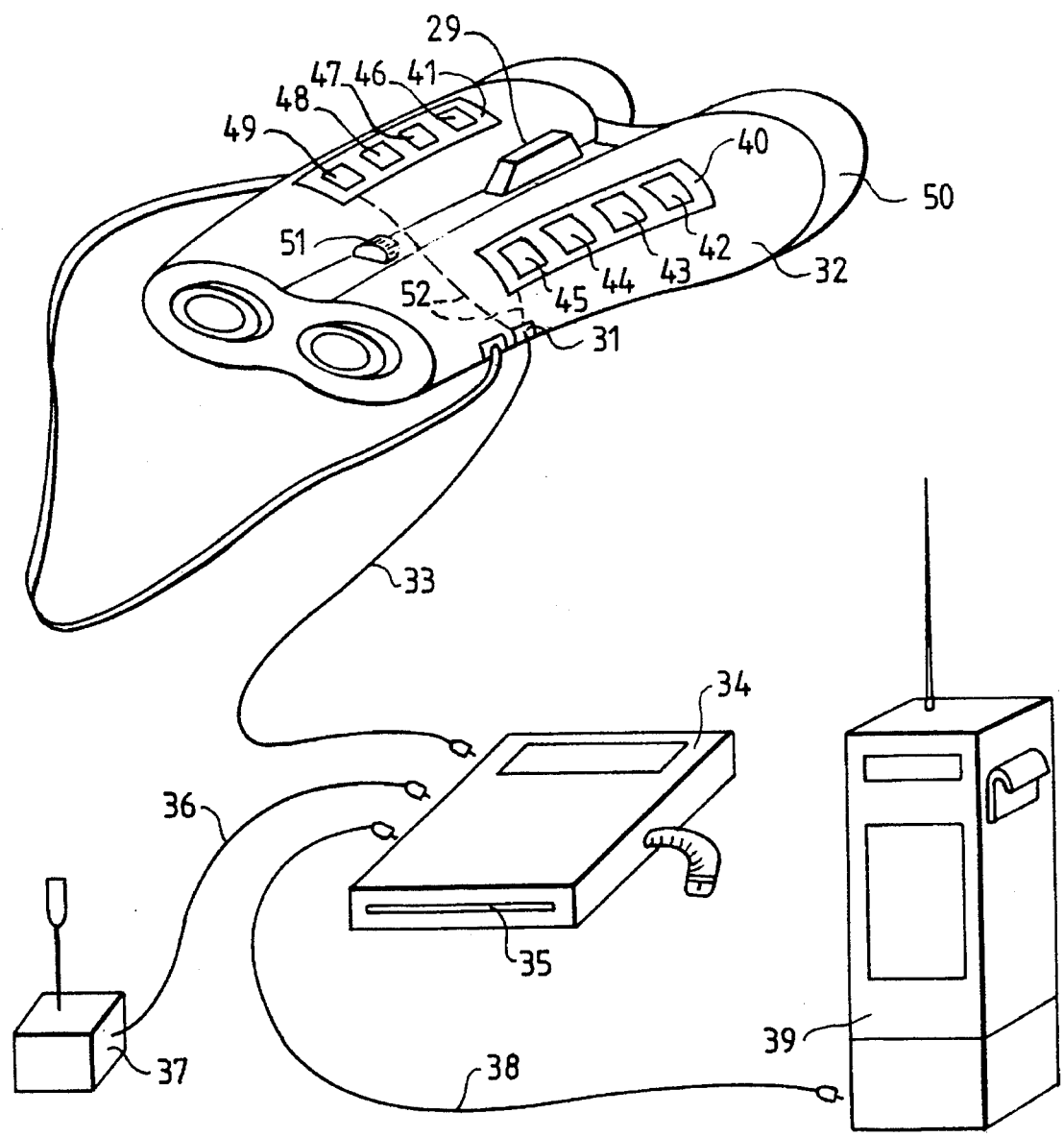

In another embodiment, represented in FIG. 5b, the binoculars carry two keypads 40 and 41 each with four buttons, giving a total of eight buttons 42 to 49.

These two pads 40 and 41 are placed on the top of the two binocular telescopes and arranged to be ergonomic and easily accessible to the fingers when the binoculars are held in the observation position.

The operation of the system depends heavily on the software in the computer.

A few of the functions that can be fulfilled using this particular embodiment of the invention are explained below:

There is an on/off button 42 which switches the computer and various binoculars components on or off. The software is configured to display menus.

As soon as the system is switched on, an internal operation system automatically runs a program which displays the two main menu options, i.e. "head-up" and "head-down". A button 44 controls a step-by-step movement of the cursor to select a head-up or head-down position, another button 45 being used to click on the part of the menu selected.

If the head-up menu is selected, the computer runs a program which allows the contours of the geographical site seen in the binoculars to be calculated from data received from the localization receiver 37 and the orientation of the binocular line of sight.

The head-up menu offers "positioning", "designation" and "laser designation" options.

A button 44 is used to move the cursor through this menu and another button 45 to click on the menu selected.

The "positioning" option displays a synthetic image on the screen representing selectively or cumulatively, as required, the elements contained in the positioning sub-menu. The elements to be positioned are extracted from the computer memory and displayed at their position in the scene.

The elements to be positioned are listed; this list includes geographical elements. Clicking on these elements using a key 45 opens a window showing the list of geographical elements than can be displayed, for example waterways, bridges, roads, electric lines, contour lines, etc.; pressing a button 44 moves down through the menu; clicking once on a button 45 selects the various elements cumulatively, clicking twice deselects the cumulative option in the "geographical elements" window, closes the window and moves onto the next element in the "positioning" function, for example "friends". Clicking on this function by pressing button 45 once displays friendly positions, and their identification, superimposed on the image.

When pressed twice, button 45 deselects this option and displays elements selected using predetermined symbols.

The designation function displays a reticule on the screen aligned with the telescope line of sight. The user presses a button 45 to designate a position. Clicking triggers the laser range-finder 29, calculates the geographical coordinates of the position and opens an identification window containing a list of possible identifications and a "help with identification" line.

If the observer can identify the position without help, he lowers the cursor through the window, using a button 44, and presses a button 45 when the cursor is on the line corresponding to the identity of the position. If he clicks on the "help with identification" line, another window opens showing abbreviated identifications which, again, can be selectively or cumulatively chosen using the procedure described above; for example, it is possible to choose wheeled vehicles, tracked vehicles, half-tracks, etc. Once the user has made his choice to match what he can see, the program displays silhouettes of vehicles satisfying the criteria selected. Keeping a button 49 pressed allows the size of the silhouette to be adjusted and keeping a button 48 pressed allows the silhouette to be rotated.

A button 47 allows the position and identity to be transmitted to various members of a team via a transceiver 39.

This position is then written into the memory of each computer.

Whatever function is selected, moving the telescope and, therefore, its field of view, in the head-up mode triggers a corresponding movement of the information image generated by screen 4.

In the head-down version of the menu, only the image generated by screen 4 is displayed and the binoculars then act as a tool to read a microscreen. As an example, it is possible to read the map at different scales and page by page using the "Atlas" mode or to continuously read a map at a selected scale by moving the telescope in a given direction, this movement causing the map to move in the same direction under the control of the movement sensors.

The above is not an exhaustive list of uses of the sensors.

These uses are given as an example only and to indicate what can be done by an integrated system centered around a computer to which a large-capacity memory device, such as an optical disk, is connected.

Similarly, the description of the telescope assembly does not include all the additional or optional modules which could be included to extend the field of use. For example, an optional light-amplifier module 50, represented in FIG. 5, could be added to provide night vision capability.

Figure 8:
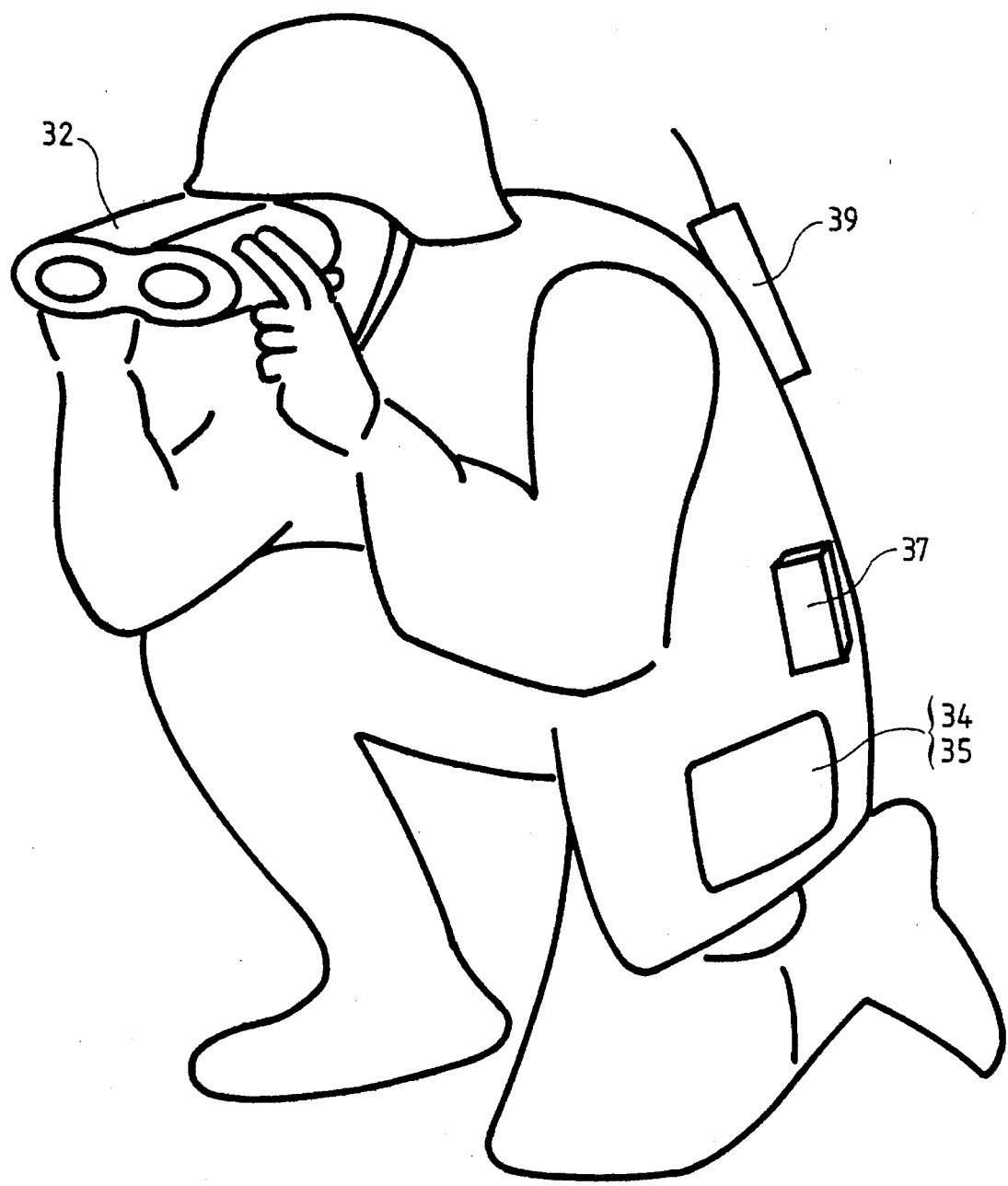
FIG. 8 represents a soldier using the complete system complying with the invention.

FIG. 8 represents a soldier using the device complying with the invention. The various components are carried in pockets or in a shoulder strap.

What is claimed is:

1. A viewing device comprising a casing for housing optical components including an objective lens and an eyepiece, these components providing a view along an optical axis (AA'), and a focusing component operator adjustable from outside the casing, the optical components forming an image of a field of view, said viewing device also including, inside the casing:

components to display a luminous image formed of pixels which can be controlled by a computer, at least one reflex optical component to superimpose the image from the display components on the image of the field of view, and, mounted on the casing, sensors to determine direction of the device line of sight and to measure an angle relative to a geographical reference, with the possibility of connecting these sensors to a computer via links.

2. The device of claim 1, in which the direction sensors are a magnetometer and an inclinometer.

3. The device of claim 1, in which the direction sensors are three gyrometers which can be connected to a computer by links.

4. The device of claim 1 in which the components that generates a luminous image is a light-emitting screen.

5. The device of claim 1, in which the components which generate a luminous image consists of a liquid crystal screen illuminated by lighting components.

6. The device of claim 5, in which the lighting components consist of a light-emitting plate and a reflex mirror.

7. The device of claim 1, in which the image reflex device consists of at least one lens and a semi-transparent mirror.

8. The device of claim 1, in which the reflex device consists of a least one lens, a mirror and a semi-transparent slide.

9. The device of claim 1, in which the reflex device is a hologram which acts as a mirror and fulfils a focussing function.

10. The device of claim 1, further comprising between the objective lens (13) and the reflex optical component (10) an electrically-controlled variable optical transmission attenuator (15).

11. The device of claim 10, in which the attenuator consists of a liquid crystal held between two thin transparent slides to which electrodes are fixed.

12. The device of claim 1, in which the casing also includes a range finder whose line of sight is parallel to a line of sight of the optical axis.

13. The device of claim 1, further comprising a connector on said casing to connect the device to computer components outside said casing.

14. The device of claim 13, said components outside said casing comprising a computer to which the casing can be connected, a link running between the computer and the casing via said connector; the computer having sets of instructions in which at least one of the sets allows calculation of memory addresses from data which includes values coming from the sensor.

15. A device as described in claim 14, in which the computer is also connected to a localization receiver via a link.

16. The device of claim 14 in which the computer is also connected to a transceiver via a link.

17. The device of claim 1, which also includes, mounted on the casing, at least one keypad, each pad containing one or several buttons which can be connected to a computer via links.

18. The device of claim 17, in which one of the keypads has only two 3-position buttons and the other has only one button.

19. A viewing device comprising
   (a) a casing for housing
   an objective,
   an eyepiece, means to display a luminous image formed of pixels which can be controlled by a computer having memories each having an address, and at least one reflex optical component to superimpose the displayed image to an image of a field of view of the viewing device, this field of view being determined by an optical axis and an aperture angle of the viewing device, the improvement comprising (b) sensors attached to the casing to determine a direction of the device line of sight, (c) means to link data coming from the sensors to a computer, (d) the computer having sets of instruction in which at least one of the sets allows calculation of memories addresses from data which include values coming from the sensors.

20. A viewing device comprising a casing for housing optical components including an objective lens and an eyepiece, these components providing a view along an optical axis (AA'), and a focusing component operator adjustable from outside the casing, the optical components forming an image of a field of view, said viewing device also including, inside the casing:

components to display a luminous image formed of pixels which can be controlled by a computer, at least one reflex optical component to superimpose the image from the display components on the image of the field of view, and, mounted on the casing, a sensor to determine direction of the device line of sight and to measure an angle relative to a geographical reference, with the possibility of connecting these sensors to a computer via links, a connector on said casing to connect the device to components outside said casing, said components comprising a computer to which the casing can be connected, a link running between the computer and the casing via said connector; and the computer having sets of instructions in which at least one of the sets allows calculation of memory addresses from data which includes values coming from the sensor.

* * * * *